(12) United States Patent
Lee et al.

(10) Patent No.: US 12,119,493 B2
(45) Date of Patent: Oct. 15, 2024

(54) NEGATIVE ELECTRODE AND SECONDARY BATTERY INCLUDING THE SAME

(71) Applicant: LG CHEM, LTD., Seoul (KR)

(72) Inventors: Hye Youn Lee, Daejeon (KR); Ji Hye Park, Daejeon (KR); Su Rim Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 802 days.

(21) Appl. No.: 17/283,109

(22) PCT Filed: Oct. 14, 2019

(86) PCT No.: PCT/KR2019/013427
§ 371 (c)(1),
(2) Date: Apr. 6, 2021

(87) PCT Pub. No.: WO2020/076139
PCT Pub. Date: Apr. 16, 2020

(65) Prior Publication Data
US 2021/0384509 A1 Dec. 9, 2021

(30) Foreign Application Priority Data

Oct. 12, 2018 (KR) ........................ 10-2018-0121540

(51) Int. Cl.
*H01M 4/58* (2010.01)
*H01M 4/13* (2010.01)
(Continued)

(52) U.S. Cl.
CPC ......... *H01M 4/5825* (2013.01); *H01M 4/133* (2013.01); *H01M 4/134* (2013.01);
(Continued)

(58) Field of Classification Search
CPC .... H01M 4/5825; H01M 4/133; H01M 4/625; H01M 4/134
See application file for complete search history.

(56) References Cited

U.S. PATENT DOCUMENTS

| | | |
|---|---|---|
| 2010/0015524 A1 | 1/2010 | Kim et al. |
| 2012/0295168 A1 | 11/2012 | Holzapfel et al. |

(Continued)

FOREIGN PATENT DOCUMENTS

| | | | |
|---|---|---|---|
| CN | 102332603 A | | 1/2012 |
| CN | 105655563 | * | 6/2016 |

(Continued)

OTHER PUBLICATIONS

CN105655563 English translation. Wu et al. China. Jun. 8, 2016. (Year: 2016).*

(Continued)

*Primary Examiner* — Christopher P Domone
(74) *Attorney, Agent, or Firm* — Birch, Stewart, Kolasch & Birch, LLP

(57) ABSTRACT

A negative electrode and a secondary battery including the negative electrode, the negative electrode includes a negative electrode active material layer containing negative electrode active material particles and an additive. The additive is present in an amount of 1.8 parts by weight to 3.2 parts by weight based on 100 parts by weight of the negative electrode active material particles. The additive includes at least one selected from the group consisting of $Li_{1+m1}Al_{m1}Ti_{2-m1}(PO_4)_3$, wherein $0<m1\leq1$, $Li_{1+m2}Al_{m2}Ge_{2-m2}(PO_4)_3$, wherein $0<m2\leq1$, $Li_{3m3}La_{2/3-m3}TiO_3$, wherein $0.2\leq m3\leq0.05$, and $Li_{3m4}La_{2/3-m4}ZrO_3$, wherein $0.2\leq m4\leq0.05$ (LATP, LAGP, LLTO, and LLZO, respectively).

10 Claims, 3 Drawing Sheets

(51) Int. Cl.
  *H01M 4/133* (2010.01)
  *H01M 4/134* (2010.01)
  *H01M 4/62* (2006.01)
  *H01M 10/0525* (2010.01)
  *H01M 4/02* (2006.01)

(52) U.S. Cl.
  CPC ....... *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2013/0143119 A1 | 6/2013 | Mah et al. |
| 2013/0273437 A1 | 10/2013 | Yoshioka et al. |
| 2013/0323578 A1 | 12/2013 | Imoto et al. |
| 2015/0372298 A1 | 12/2015 | Fujieda et al. |
| 2016/0268589 A1 | 9/2016 | Do et al. |
| 2018/0269483 A1* | 9/2018 | Cho ..................... H01M 4/483 |

FOREIGN PATENT DOCUMENTS

| | | |
|---|---|---|
| CN | 105849949 A | 8/2016 |
| JP | 2010-56027 A | 3/2010 |
| JP | 2013-507814 A | 3/2013 |
| JP | 2013-251061 A | 12/2013 |
| JP | 2015-32425 A | 2/2015 |
| JP | 5858289 B2 | 2/2016 |
| JP | 2016-66678 A | 4/2016 |
| JP | 2018-37341 A | 3/2018 |
| KR | 10-2013-0062105 A | 6/2013 |
| KR | 10-2014-0033934 A | 3/2014 |
| KR | 10-2017-0074030 A | 6/2017 |
| KR | 10-2017-0092296 A | 8/2017 |
| KR | 10-2018-0015841 A | 2/2018 |
| KR | 10-2018-0038764 A | 4/2018 |
| KR | 10-1847035 B1 | 4/2018 |
| KR | 10-2018-0083743 A | 7/2018 |
| WO | WO 2014/132320 A1 | 9/2014 |
| WO | WO 2018/125784 A1 | 8/2015 |

OTHER PUBLICATIONS

CN105655563 English translation (Year: 2016).*
Extended European Search Report for European Application No. 19872180.5, dated Oct. 18, 2021.
International Search Report (PCT/ISA/210) issued in PCT/KR2019/013427, dated Jan. 22, 2020.

* cited by examiner

NEGATIVE ELECTRODE AND SECONDARY BATTERY INCLUDING THE SAME

CROSS-REFERENCE TO RELATED APPLICATIONS

This application claims the benefit of Korean Patent Application No. 10-2018-0121540, filed on Oct. 12, 2018, in the Korean Intellectual Property Office, the disclosure of which is incorporated herein in its entirety by reference.

TECHNICAL FIELD

Technical Field

The present invention relates to a negative electrode including a negative electrode active material layer containing negative electrode active material particles and an additive, wherein the additive is included in an amount of 1.8 parts by weight to 3.2 parts by weight based on 100 parts by weight of the negative electrode active material particles, and the additive includes at least one selected from the group consisting of LATP, LAGP, LLTO, and LLZO.

Background Art

As technology development and demand for mobile devices have increased in recent years, the demand for secondary batteries as an energy source has been rapidly increased. Accordingly, various studies have been conducted on batteries which may meet various needs. In particular, research has been actively conducted on a lithium secondary battery having high energy density and excellent lifespan and cycle properties as a power source for such devices.

A lithium secondary battery means a battery including a positive electrode containing a positive electrode active material capable of intercalation/de-intercalation of lithium ions, a negative electrode containing a negative electrode active material capable of intercalation/de-intercalation of lithium ions, and a non-aqueous electrolyte containing lithium ions in an electrode assembly having a microporous separator interposed between the positive electrode and the negative electrode. As the negative electrode active material, a lithium metal, a lithium alloy, crystalline or amorphous carbon, a carbon composite, a graphite-based active material, a silicon-based active material, and the like are used.

Meanwhile, in the case of a lithium secondary battery, there is a problem in that output is deteriorated at low temperatures. In order to solve the above problem, various attempts have been made for a lithium secondary battery having excellent output properties at low temperatures.

For example, there is a method for improving the low-temperature performance of a battery by including propylene carbonate in a non-aqueous electrolyte. However, when the propylene carbonate is used, there is a problem in that an interlayer of a graphite-based active material is delaminated, thereby deteriorating battery performance. For another example, there is a method for manufacturing and using a negative electrode active material in a size of nanometers. However, due to the polycrystalline nature of a nanostructure, the charge transfer resistance is increased so that battery performance may be deteriorated.

Therefore, the present invention introduces a new method capable of increasing low-temperature output properties of a lithium secondary battery.

DISCLOSURE OF THE INVENTION

Technical Problem

The purpose of the present invention is to improve the low-temperature output properties of a lithium secondary battery by allowing a negative electrode to include a specific additive in an appropriate amount, while minimizing the capacity deterioration and resistance increase of the lithium secondary battery.

Technical Solution

According to an aspect of the present invention, there is provided a negative electrode including a negative electrode active material layer containing negative electrode active material particles and an additive, wherein the additive is present in an amount of 1.8 parts by weight to 3.2 parts by weight based on 100 parts by weight of the negative electrode active material particles, and the additive includes at least one selected from the group consisting of LATP, LAGP, LLTO, and LLZO.

According to another aspect of the present invention, there is provided a secondary battery including the negative electrode, a positive electrode, a separator interposed between the positive electrode and the negative electrode, and an electrolyte.

Advantageous Effects

According to the present invention, a negative electrode active material layer includes at least one selected from the group consisting of LATP, LAGP, LLTO, and LLZO in an appropriate amount. Accordingly, the diffusion rate and conductivity of lithium ions may be improved while minimizing the capacity decrease and resistance increase of a lithium secondary battery. Therefore, the output properties of the lithium secondary battery at a low temperature, particularly at a temperature of −10° C. or less, may be improved.

BEST MODE FOR CARRYING OUT THE INVENTION

Figure 1:
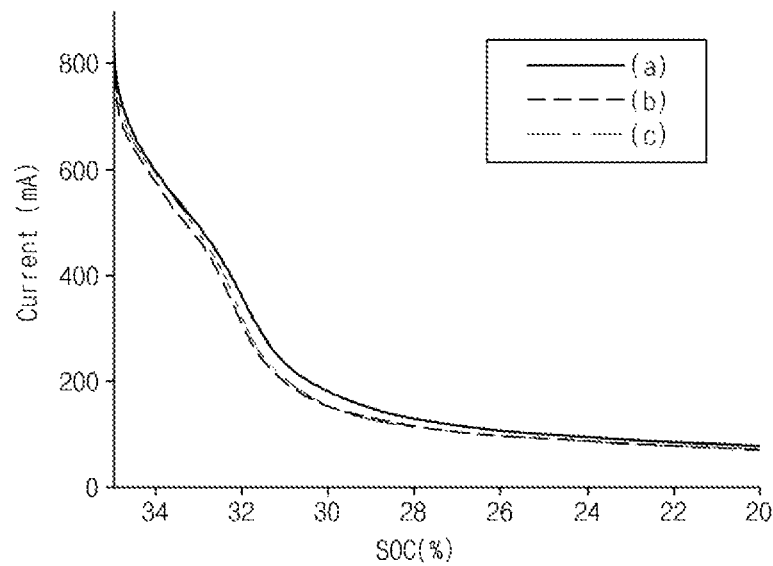
FIG. 1 is a graph showing the low-temperature output properties of batteries using the negative electrode according to each of Example 1, Comparative Example 1, and Comparative Example 2.

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present specification, an average particle diameter ($D_{50}$) may be defined as a particle diameter corresponding to 50% of the cumulative amount in a particle diameter distribution curve of particles. The average particle diameter ($D_{50}$) may be measured by, for example, a laser diffraction method. The laser diffraction method generally enables measurement of a particle diameter from a sub-micron region to several millimeters, so that results of high reproducibility and high resolution may be obtained.

<Negative Electrode>

A negative electrode according to an embodiment of the present invention includes a negative electrode active material layer containing negative electrode active material particles and an additive, wherein the additive is included in an amount of 1.8 parts by weight to 3.2 parts by weight based on 100 parts by weight of the negative electrode active material particles, and the additive includes at least one selected from the group consisting of LATP, LAGP, LLTO, and LLZO.

The negative electrode may include a current collector. The current collector is not particularly limited as long as it has conductivity without causing a chemical change in the battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon such as copper and nickel well may be used as the current collector. The thickness of the current collector may be from 6 μm to 20 μm, but the thickness of the current collector is not limited thereto.

The negative electrode active material layer may be disposed on the current collector. The negative electrode active material layer may cover one surface or both surfaces of the current collector. The negative electrode active material layer may include negative electrode active material particles and an additive.

(1) Negative Electrode Active Material Particles

The negative electrode active material particles may include at least one of silicon-based active material particles or graphite-based active material particles. As the silicon-based active material particles, one or more selected from the group consisting of Si, $SiO_x(0<x≤2)$, an Si—C composite, and an Si—Y alloy (wherein Y is an element selected from the group consisting of an alkali metal, an alkaline earth metal, a transition metal, a Group 13 element, a Group 14 element, a rare earth element, and a combination thereof). The graphite-based active material particles may include one or more selected from the group consisting of artificial graphite, natural graphite, graphitized carbon fiber, and graphitized mesocarbon microbeads. More specifically, the negative electrode active material particles may include artificial graphite and $SiO_x(0<x≤2)$.

The negative electrode active material particles may be included in the negative electrode active material layer in an amount of 80 wt % to 97 wt %, specifically 85 wt % to 96 wt %. When the above range is satisfied, the capacity of a battery manufactured may be secured.

(2) Additive

When a lithium secondary battery is at a low temperature, the additive may serve to improve the conductivity of lithium ions in a solid electrolyte interface (SEI) layer on the surface of the negative electrode and to improve the lithium diffusion in the negative electrode.

The additive may be at least one selected from the group consisting of $Li_{1+m1}Al_{m1}Ti_{2-m1}(PO_4)_3$ (LATP), $Li_{1+m2}Al_{m2}Ge_{2-m2}(PO_4)_3$ (0<m2≤1, LAGP) $Li_{3m3}La_{2/3-m3}TiO_3$ (0.2≤m3≤0.05, LLTO), and $Li_{3m4}La_{2/3-m4}ZrO_3$(0.2≤m4≤0.05, LLZO). The additive may help the movement of lithium ions inside the negative electrode and the SEI layer on the surface of the negative electrode, so that battery output performance at low temperatures may be improved.

Particularly, the additive may be LATP. The LATP may further improve the battery output performance at low temperatures due to the high ion conductivity thereof.

In the negative electrode active material layer, the additive may be included in an amount of 1.8 parts by weight to 3.2 parts by weight based on 100 parts by weight of the negative electrode active material particles. When less than 1.8 parts by weight, the amount is so small that it is difficult for the additive to be uniformly present on the surface of the negative electrode. Accordingly, it is difficult to improve the low-temperature output properties of a battery. On the contrary, when greater than 3.2 parts by weight, the surfaces of the negative electrode active material particles are overly covered by the additive, so that there is a problem in that the capacity of a battery is significantly reduced. Specifically, the additive may be included in an amount of 2 parts by weight to 3 parts by weight based on 100 parts by weight of the negative electrode active material particles, more specifically 2 parts by weight to 2.5 parts by weight.

The average particle diameter ($D_{50}$) of the additive may be 0.1 μm to 5 μm, specifically 0.2 μm to 2 μm. When the above range is satisfied, the low-temperature output properties of a battery may be further improved. More specifically, the average particle diameter ($D_{50}$) of the additive may be 0.8 μm to 2 μm. When the above range is satisfied, the viscosity of a negative electrode slurry is suppressed from being excessively increased, so that it is easy to coat the negative electrode slurry when manufacturing a negative electrode and the side reaction occurring between surface impurities of the additive and an electrolyte may be suppressed.

(3) Other Components

The negative electrode active material layer may further include a binder. The binder may be a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, and polyacrylic acid, or a polymer having the hydrogen thereof substituted with Li, Na, or Ca, and the like, or various kinds of binder polymers such as various copolymers thereof.

The negative electrode active material layer may further include a conductive material. The conductive material is not particularly limited as long as it has conductivity without causing a chemical change in the battery. For example, a carbon-based material such as carbon black, acetylene black, Ketjen black, channel black, furnace black, lamp black, and thermal black; conductive fiber such as carbon fiber and metal fiber; a conductive tube such as a carbon nanotube; fluorocarbon powder; metal powder such as aluminum powder, and nickel powder; a conductive whisker such as zinc oxide and potassium titanate; a conductive metal oxide such as titanium oxide; a conductive material such as a polyphenylene derivative, and the like may be used. The conductive material may be preferably carbon black, and more specifically, may be carbon black having an average particle diameter of several tens of nanometers.

<Secondary Battery>

The present invention provides a secondary battery including a positive electrode, a negative electrode, an electrolyte, and a separator interposed between the positive electrode and the negative electrode. The negative electrode is the same as the negative electrode of an embodiment described above, and the secondary battery may be a lithium secondary battery.

The secondary battery may be manufactured by a typical method known in the art. For example, the secondary battery may be manufactured by placing a separator between a positive electrode and a negative electrode, and injecting an electrolyte in which lithium salt is dissolved.

The positive electrode may include a positive electrode active material. As the positive electrode active material, a lithium transition metal oxide may be preferably used. For example, one or a mixture of two or more selected from the group consisting of $Li_{x1}CoO_2(0.5<x1<1.3)$, $Li_{x2}NiO_2$ $(0.5<x2<1.3)$, $Li_{x3}MnO_2(0.5<x3<1.3)$, $Li_{x4}Mn_2O_4$ $(0.5<x4<1.3)$, $Li_{x5}(Ni_{a1}Co_{b1}Mn_{c1})O_2(0.5<x5<1.3, 0<a1<1, 0<b1<1, 0<c1<1, a1+b1+c1=1)$, $Li_{x6}Ni_{1-y1}Co_{y1}O_2$ $(0.5<x6<1.3, 0<y1<1)$, $Li_{x7}Co_{1-y2}Mn_{y2}O_2(0.5<x7<1.3, 0\leq y2<1)$, $Li_{x8}Ni_{1-y3}Mn_{y3}O_2(0.5<x8<1.3, 0\leq y3<1)$, $Li_{x9}$ $(Ni_{a2}Co_{b2}Mn_{c2})O_4(0.5<x9<1.3, 0<a2<2, 0<b2<2, 0<c2<2, a2+b2+c2=2)$, $Li_{x10}Mn_{2-z1}Ni_{z1}O_4(0.5<x10<1.3, 0<z1<2)$, $Li_{x11}Mn_{2-z2}Co_{z2}O_4(0.5<x11<1.3, 0<z2<2)$, $Li_{x12}CoPO_4$ $(0.5<x12<1.3)$, and $Li_{x13}FePO_4(0.5<x13<1.3)$ may be used.

As the separator included in a lithium secondary battery according to the present invention, a typical porous polymer film, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present invention is not limited thereto.

The electrolyte included in a lithium secondary battery according to the present invention may be one or more mixed organic solvents selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

In addition, the electrolyte according to the present invention may further include a lithium salt, and the negative electrode ions of the lithium salt may be one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

A lithium secondary battery according to the present invention may be a cylindrical, rectangular, or pouch-type secondary battery, but is not limited thereto as long as it is a charging/discharging device.

In addition, the present invention provides a battery module including the lithium secondary battery as a unit cell, and a battery pack including the same.

The battery pack may be used as a power source of one or more kinds of medium-and-large sized device such as a power tool, electric cars including an electric vehicle (EV), a hybrid electric vehicle (HEV), and a plug-in hybrid electric vehicle (PHEV), or a power storage system.

Hereinafter, Examples of the present invention will be described in detail so that those skilled in the art may easily carry out the present invention. However, the present invention may be embodied in many different forms, and is not limited to Examples set forth herein.

Example 1: Manufacturing of Negative Electrode

A mixture in which artificial graphite and SiO are mixed in a weight ratio of 95:5 was used as negative electrode active material particles. The negative electrode active material particles; styrene butadiene rubber (SBR) and carboxy methyl cellulose (CMC) as binders; and super C65 as a conductive material; and LATP having an average particle diameter ($D_{50}$) of 1 μm; were added and mixed in distilled water to prepare a negative electrode slurry having 47% of solids in the mixture. At this time, the weight ratio of the negative electrode active material particles, the styrene butadien rubber (SBR), the carboxy methyl cellulose (CMC), and the conductive material was 95:1.5:2.3:1.2, and LATP was 2 parts by weight based on 100 parts by weight of the negative active material particles.

The negative electrode slurry was applied on a copper current collector having a thickness of 20 μm to prepare a preliminary electrode. At this time, the temperature of circulated air was 80° C. Thereafter, the preliminary electrode was roll pressed, at a pressure of Gap20, dried in a vacuum oven at 130° C. for 10 hours, and then punched to a monocell size of 17.34 cm2 to manufacture a negative electrode.

Comparative Example 1: Manufacturing of Negative Electrode

A negative electrode of Comparative Example 1 was manufactured in the same manner as in Example 1 except that LATP was not used.

Comparative Example 2: Manufacturing of Negative Electrode

A negative electrode of Comparative Example 2 was manufactured in the same manner as in Example 1 except that LATP was used in an amount of 1 part by weight.

Comparative Example 3: Manufacturing of Negative Electrode

A negative electrode of Comparative Example 3 was manufactured in the same manner as in Example 1 except that LATP was used in an amount of 5 parts by weight.

Comparative Example 4: Manufacturing of Negative Electrode

A negative electrode of Comparative Example 4 was manufactured in the same manner as in Example 1 except that LATP of 0.4 μm, instead of LATP of 1 μm, was used in an amount of 5 parts by weight.

TABLE 1

| | Additive content (parts by weight based on 100 parts by weight of negative electrode active material particle) | Average particle diameter ($D_{50}$) of additive |
|---|---|---|
| Example 1 | 2 | 1 |
| Comparative Example 1 | 0 | — |
| Comparative Example 2 | 1 | 1 |
| Comparative Example 3 | 5 | 1 |
| Comparative Example 4 | 5 | 0.4 |

EXPERIMENT EXAMPLES

A battery was manufactured as follows, using the negative electrode of each of Example and Comparative Examples. Li[$Ni_{0.8}Co_{0.1}Mn_{0.1}$]$O_2$ which is a positive electrode active material, carbon black which is a conductive material, polyvinylidene fluoride which is a binder, and H-NBR which is a dispersant were mixed at a weight ratio of 97.5:1:1.35:0.15 to N-methyl-2-pyrrolidone which is a solvent to prepare a positive electrode slurry. The prepared positive electrode slurry was applied to an aluminum (Al) current collector having a thickness of 12 μm such that an electrode loading (mg/cm$^2$) was 645 mg per unit area, dried in a vacuum oven at 120° C. for 10 hours, and then roll pressed to manufacture a positive electrode having a final thickness (current collector+active material layer) of 158.0 μm. The negative electrode of each of Example and Comparative Examples, a positive electrode, and a porous polyethylene separator were assembled using a stacking method, and the assembled battery was injected with an electrolyte (ethylene carbonate (EC)/ethyl methyl carbonate (EMC) =3/7 (volume ratio), lithium hexa fluoro phosphate (1 mole of LiPF$_6$) to manufacture a lithium secondary battery.

Thereafter, the low-temperature output properties, capacity properties, and resistance properties thereof were evaluated through the following methods.

Figure 2:
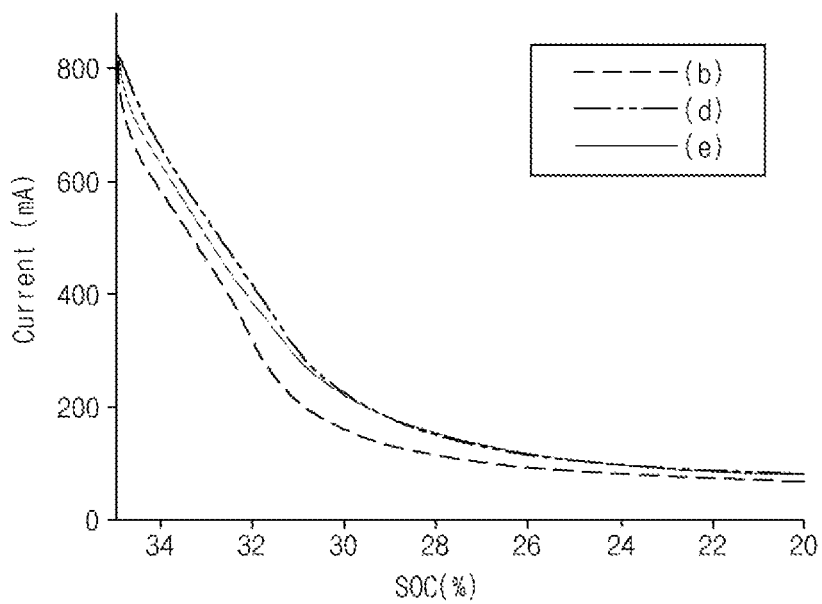
FIG. 2 is a graph showing the low-temperature output properties of batteries using the negative electrode according to each of Comparative Example 1, Comparative Example 3, and Comparative Example 4.

(1) Experimental Example 1: Low-Temperature Output Performance and Evaluation The termination current (end I) value was confirmed when each battery charged with SOC 35% was continuously discharged at −10° C. to SOC 20% and to the lowest limit voltage of 2.5 V at a 5.5 C current rate, and the value was divided by an initial capacity to confirm a C-rate at the termination current. Through the above, low-temperature output properties were compared (see Table 2 and FIGS. 1 and 2—Example 1: (a), Comparative Example 1: (b), Comparative Example 2: (c), Comparative Example 3: (d), Comparative Example 4: (e)).

(2) Experimental Example 2: Capacity Properties Evaluation

Figure 3:
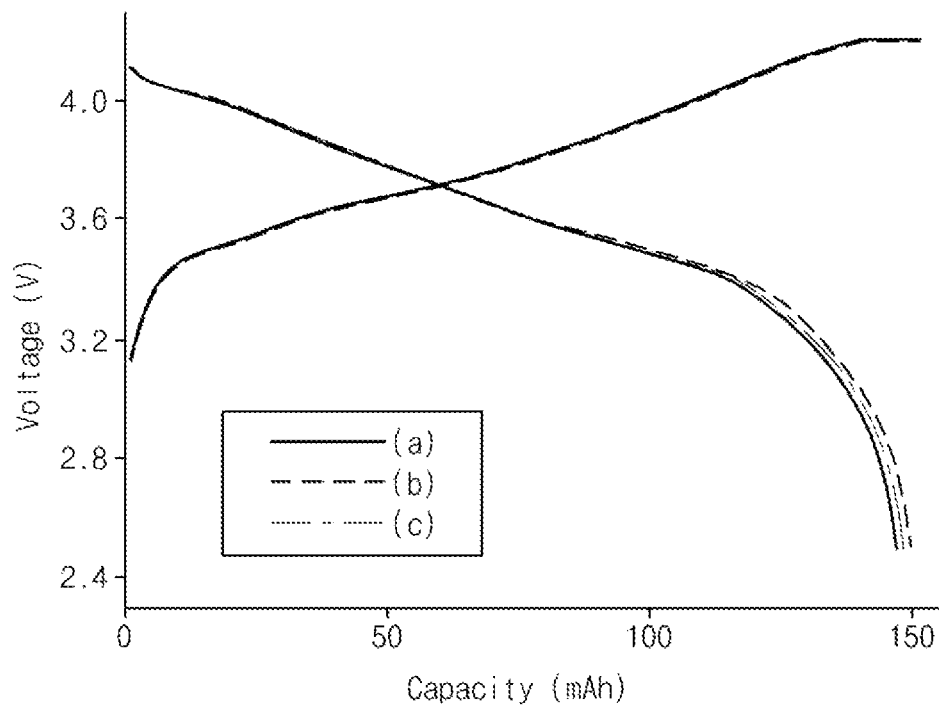
FIG. 3 is a graph showing the capacity properties of batteries using the negative electrode according to each of Example 1, Comparative Example 1, and Comparative Example 2.
Figure 4:
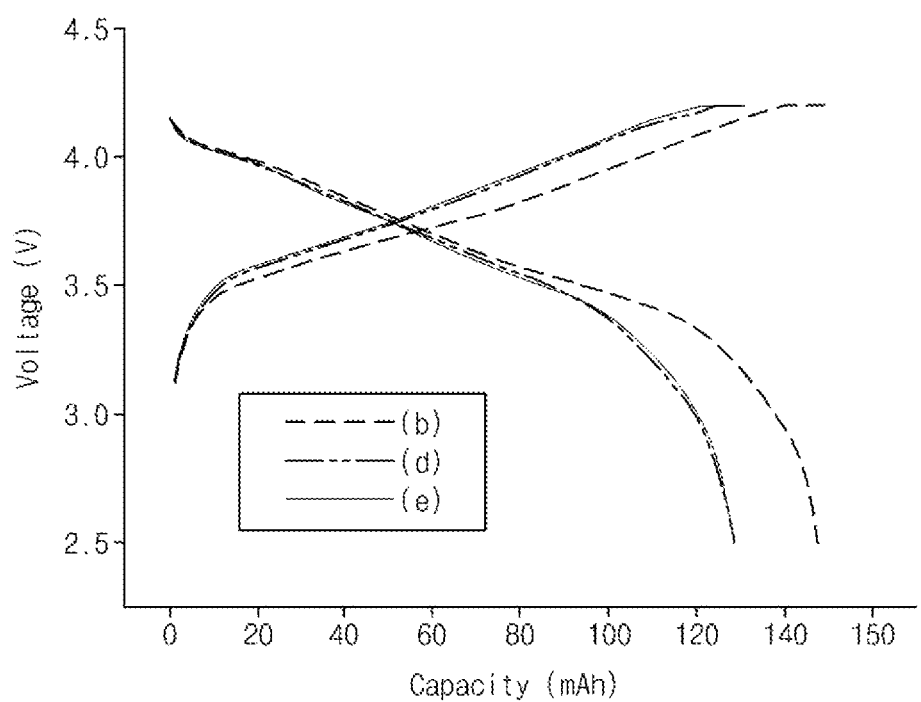
FIG. 4 is a graph showing the capacity properties of batteries using the negative electrode according to each of Comparative Example 1, Comparative Example 3, and Comparative Example 4.

Each battery was charged with a constant current (CC) of 0.33 C under constant current/constant voltage (CC/CV) conditions, and then charged with the constant current (CC) until a charging current becomes 0.05 C (4.2 V at full charge). Thereafter, each battery was discharged with the constant current (CC) of 0.33 C to 2.5V. The charge and discharge graphs are shown in FIGS. 3 and 4 (Example 1: (a), Comparative Example 1: (b), Comparative Example 2: (c), Comparative Example 3: (d), Comparative Example 4: (e)), and the discharge capacity is shown in Table 2.

(3) Experimental Example 3: Resistance Evaluation

Figure 5:
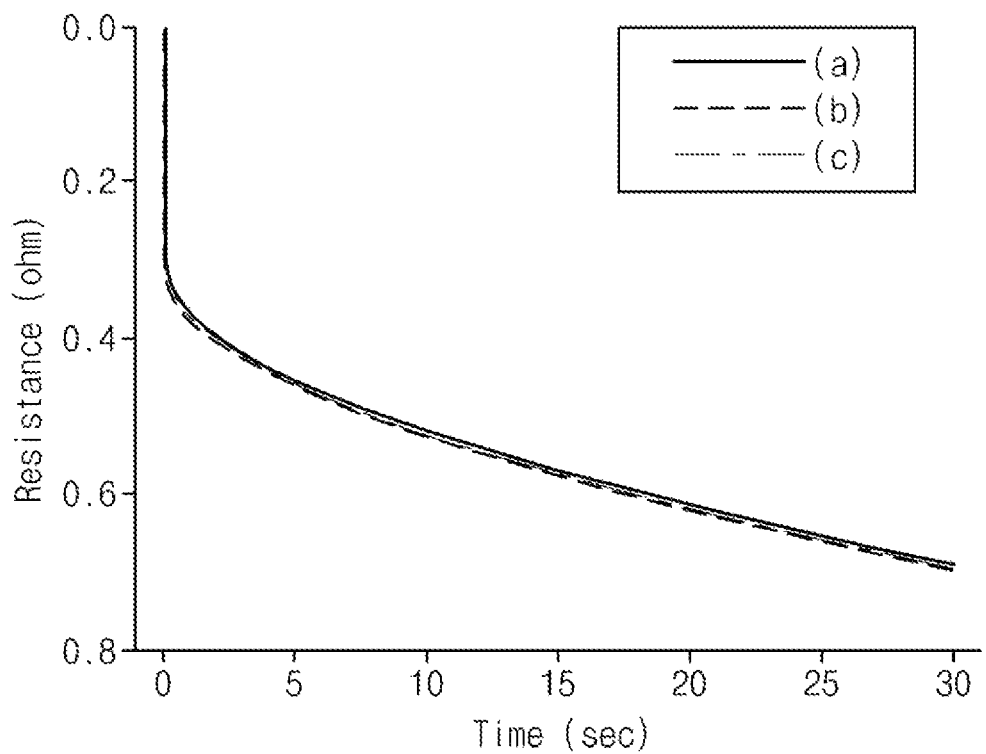
FIG. 5 is a graph showing the resistance properties of batteries using the negative electrode according to each of Example 1, Comparative Example 1, and Comparative Example 2.
Figure 6:
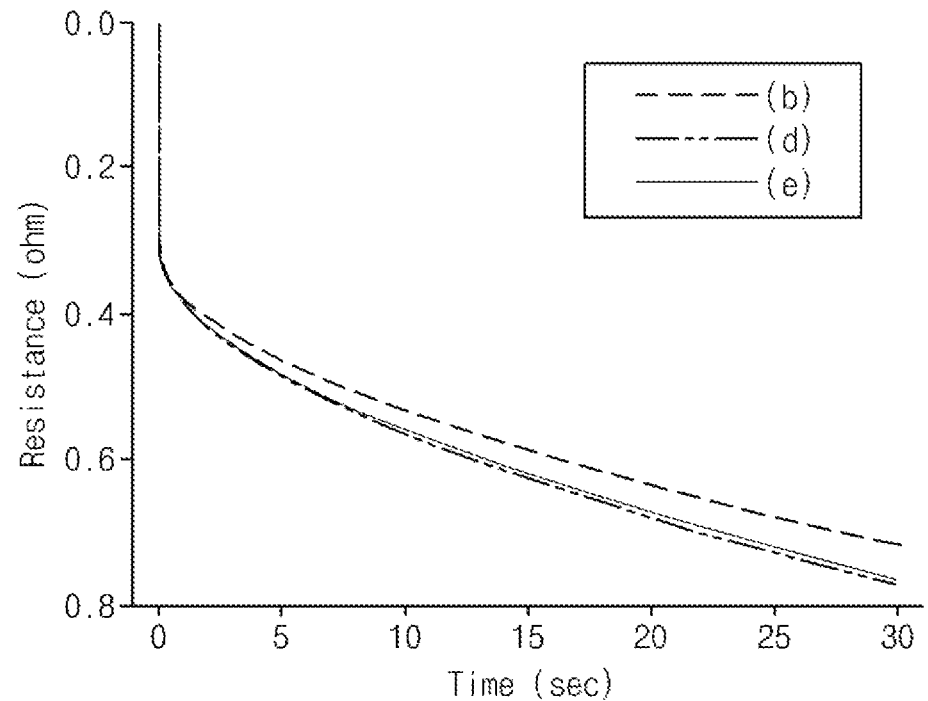
FIG. 6 is a graph showing the resistance properties of batteries using the negative electrode according to each of Comparative Example 1, Comparative Example 3, and Comparative Example 4.

Each battery was charged to 0.33 C to confirm the capacity thereof, and the battery was set to 50% of the capacity (SOC 50%). Thereafter, while discharging each battery to 2.5 C, a measured voltage value was divided by a current value 2.5 C to derive a resistance value. The results are shown in FIGS. 5 and 6 (Example 1: (a), Comparative Example 1: (b), Comparative Example 2: (c), Comparative Example 3: (d), Comparative Example 4: (e)).

TABLE 2

| | Termination current (mA) | C-rate (C) | Capacity (mAh) |
|---|---|---|---|
| Example 1 | 80.2 | 0.55 | 143.0 |
| Comparative Example 1 | 72.7 | 0.49 | 148.2 |
| Comparative Example 2 | 72.6 | 0.49 | 147.3 |
| Comparative Example 3 | 82.9 | 0.67 | 123.3 |
| Comparative Example 4 | 77.2 | 0.63 | 122.4 |

According to FIGS. 1 to 6 and Table 1, in the case of Example 1 in which an additive was used in a content satisfying an appropriate range (2 parts by weight), the termination current was higher than that of each of Comparative Examples 1, 2, and 4, and since the C-rate of Example 1 was higher at low temperatures, it can be seen that the low-temperature properties thereof were good. In addition, when compared with Comparative Example 1 in which an additive was not used, the capacity reduction of Example 1 was not large and the resistance thereof was similar to that of Comparative Example 1. Accordingly, it can be seen that when the negative electrode according to the present invention is used, the low-temperature output properties may be improved while minimizing the capacity deterioration and resistance increase.

In the case of Comparative Example 2, the content of additive was as small as 1 part by weight, so that the low-temperature output properties were hardly improved. In the case of Comparative Examples 3 and 4, the content of additive was as excessively high as 5 parts by weight, so that the battery capacity was excessively reduced.

The invention claimed is:

1. A negative electrode comprising:
a negative electrode active material layer comprising negative electrode active material particles and an additive,
wherein the negative electrode active material particles comprise artificial graphite and $SiO_x$, wherein $0<x\leq2$,
wherein the additive is present in an amount of 1.8 parts by weight to 3.2 parts by weight based on 100 parts by weight of the negative electrode active material particles, wherein an average particle diameter (D50) of the additive is 0.8 μm to 5 μm, and
wherein the additive comprises at least one selected from the group consisting of $Li_{1+m1}Al_{m1}Ti_{2-m1}(PO_4)_3$ (LATP), wherein $0<m1\leq1$, $Li_{1+m2}Al_{m2}Ge_{2-m2}(PO_4)_3$ (LAGP), wherein $0<m2\leq1$, $Li_{3m3}La_{2/3-m3}TiO_3$ (LLTO), wherein $0.05\leq m3\leq0.2$, and $Li_{3m4}La_{2/3-m4}ZrO_3$ (LLZO), wherein $0.05\leq m4\leq0.2$.

2. The negative electrode of claim 1, wherein the additive is present in an amount of 2 parts by weight to 2.5 parts by weight based on 100 parts by weight of the negative electrode active material particles.

3. The negative electrode of claim 1, wherein the additive is LATP.

4. The negative electrode of claim 1, wherein an average particle diameter ($D_{50}$) of the additive is 0.8 μm to 2 μm.

5. The negative electrode of claim 1, wherein the negative electrode active material particles comprise other particles that are silicon-based or graphite-based.

6. The negative electrode of claim 1, wherein the negative electrode active material particles comprise $SiO_x$, wherein x is 1.

7. The negative electrode of claim 1, wherein the negative electrode active material particles are present in the negative electrode active material layer in an amount of 80 wt % to 97 wt %.

8. The negative electrode of claim 1, wherein the negative electrode active material layer further comprises a conductive material.

9. A secondary battery comprising:
the negative electrode of claim 1;
a positive electrode;
a separator interposed between the positive electrode and the negative electrode; and
an electrolyte.

10. The negative electrode of claim 1, wherein an average particle diameter (D50) of the additive is 2 μm to 5 μm.

* * * * *